(12) United States Patent
Rieder et al.

(10) Patent No.: US 7,050,112 B2
(45) Date of Patent: May 23, 2006

(54) METHOD AND DEVICE FOR DISPLAYING AT LEAST TWO IMAGES WITHIN ONE COMBINED PICTURE

(75) Inventors: Peter Rieder, Munich (DE); Marko Hahn, Munich (DE); Markus Schu, Erding (DE); Christian Tuschen, Munich (DE)

(73) Assignee: Micronas GmbH, Freiburg (DE)

( * ) Notice: Subject to any disclaimer, the term of this patent is extended or adjusted under 35 U.S.C. 154(b) by 318 days.

(21) Appl. No.: 10/161,212

(22) Filed: May 31, 2002

(65) Prior Publication Data

US 2002/0196369 A1   Dec. 26, 2002

(30) Foreign Application Priority Data

Jun. 1, 2001   (DE) .............................. 101 26 790

(51) Int. Cl.
  *H04N 9/74*   (2006.01)
(52) U.S. Cl. .................................................. 348/565
(58) Field of Classification Search ........ 348/563–569, 348/588; 382/268, 294; 345/115, 629, 638, 345/641
  See application file for complete search history.

(56) References Cited

U.S. PATENT DOCUMENTS

| 5,282,037 | A |   | 1/1994  | Eguchi et al. ............... 358/182 |
| 5,416,529 | A |   | 5/1995  | Lake ........................... 348/590 |
| 5,528,290 | A | * | 6/1996  | Saund ........................ 348/218.1 |
| 5,594,467 | A | * | 1/1997  | Marlton et al. ............. 345/641 |
| 5,625,764 | A |   | 4/1997  | Tsujimoto et al. .......... 395/135 |
| 5,892,521 | A |   | 4/1999  | Blossom et al. ............ 345/501 |
| 5,896,128 | A |   | 4/1999  | Boyer ......................... 345/327 |
| 6,005,987 | A | * | 12/1999 | Nakamura et al. .......... 382/294 |
| 6,362,854 | B1 | * | 3/2002 | Fierke et al. ................ 348/584 |
| 6,522,787 | B1 | * | 2/2003 | Kumar et al. ............... 382/268 |

(Continued)

FOREIGN PATENT DOCUMENTS

EP   0 779 608   6/1997   ...................... 5/45

(Continued)

*Primary Examiner*—Paulos M. Natnael
(74) *Attorney, Agent, or Firm*—O'Shea Getz & Kosakowski P.C.

(57) ABSTRACT

A device for processing a first video signal and a second video signal that contain image data which overlap within a combined picture includes a processing element and a controller. The processing element receives the first video signal containing first image pixel data and receives the second video signal containing second image pixel data, and processes the first video signal and the second video signal to generate a third video signal indicative of an overlap region of images formed by the first and second video signals. The controller receives the first video signal, the second video signal, and the third video signal, and in response to a plurality of control signals selectively outputs one of the first, second and third video signals, wherein the third video signal is a weighted sum of the first and second video signals, wherein the control signals comprise a first control signal indicative of the location and size of a first image associated with the first video signal within a picture and a second control signal indicative of the location and size of a second image associated with the second video signal within the picture.

14 Claims, 7 Drawing Sheets

U.S. PATENT DOCUMENTS

| | | | |
|---|---|---|---|
| 6,545,685 B1 * | 4/2003 | Dorbie | 345/582 |
| 6,587,155 B1 * | 7/2003 | Xue | 348/595 |
| 6,771,304 B1 * | 8/2004 | Mancuso et al. | 348/39 |
| 6,912,251 B1 * | 6/2005 | Ward et al. | 375/240 |
| 2003/0122961 A1 * | 7/2003 | Li | 348/448 |

FOREIGN PATENT DOCUMENTS

| | | | |
|---|---|---|---|
| EP | 0 605 945 B1 | 12/1997 | 5/14 |
| GB | 2 348 758 A | 10/2000 | |
| WO | WO 01/24518 A1 | 4/2001 | 5/45 |

\* cited by examiner

METHOD AND DEVICE FOR DISPLAYING AT LEAST TWO IMAGES WITHIN ONE COMBINED PICTURE

BACKGROUND OF THE INVENTION

The invention relates to displaying an image from a first video channel and an image from a second video channel within one combined picture.

In order to display an image from a first video channel and an image from a second video channel within one combined picture, a known approach is to feed a first video signal and a second video signal to a multiplexer, wherein the first video signal contains video information for a first image to be displayed in a first active region of the combined picture, and the second video signal contains video information for a second image to be displayed in a second active region of the combined picture. In the known method, the multiplexer generates an output video signal from the first and second video signals which may be utilized to display the combined picture using a conventional display device such as a monitor.

The combined picture is built up line-by-line, that is, the video information for adjacent pixels within the combined picture is present in the output signal in temporally sequential form. Similarly, the first and second video signals contain video information for adjacent pixels in temporally sequential form. For each pixel whose video information is contained in the output signal, the multiplexer decides whether the pixel lies within the first or second active regions of the combined picture, or outside of these active regions. If the pixel lies within the first active region, the multiplexer transmits the first video signal, or the video information from this video signal, to the output to generate the output signal. If the pixel lies within the second active region, the multiplexer transmits the second video signal to the output, and if the pixel lies outside the first and second active regions the multiplexer transmits a video signal for a background image to the output. The sequential values of the output signal which contains the line-by-line information for the combined picture are thus obtained for the background image from the first or second video signals depending on the position of a given pixel within the combined picture.

To enable the decision to be made as to whether a given pixel lies within or outside of the first or second active regions, the multiplexer is fed control signals which contain information on the position and dimensions of the active regions.

If the first and second active regions overlap, a priority signal is referenced to decide whether to take the video information for a given pixel of the overlap region from the first or second video signals, the priority signal determining which of the video signals to use to display the pixels of the overlap region, that is, which of the two images must be in the foreground while the other of the two images is partially or completely covered. Given two images to be displayed, the priority signal may assume two different values such that if there is a change in the priority signal, the image previously displayed in the background may now move to the foreground.

The known method permits only the display of the video information from one of the video signals in the overlap region.

Therefore, there is a need for a system and a method of displaying a first and a second image within a combined picture which allows for the display of video information from the first and second video signals within the overlap region, and in which cross-fading from the first to the second image within the overlap region is possible when the image to be displayed in the foreground changes.

SUMMARY OF THE INVENTION

A method for displaying a first and second image which at least partially overlap within one combined picture provides a first video signal for displaying the first image within a first active region of the combined picture, and a second video signal for displaying the second image in a second active region of the combined picture. According to the invention, a third video signal is generated from the first video signal and the second video signal, and an output signal for displaying the combined picture is generated from the first, second, and third video signals, the video information from the third video signal being used to display the pixels of the overlap region.

The information on the position and dimensions of the first active region is preferably contained in a first control signal, the information on the position and dimensions of the second active region is preferably contained in a second control signal, and the information on the position and dimensions of the overlap region is preferably contained in a third control signal. These control signals are used to decide whether a given set of video information from the first, second or third video signals is mapped to the output signal. The third video signal has the highest priority here, that is, video information for pixels of the overlap region are always obtained from the third video signal.

Various approaches are provided to generate the third video signal from the first and second video signals, which approaches may be employed either independently of each other or sequentially.

According to a first embodiment, the first and second video signals are added together. Pixels are thus produced within the overlap region, the video information of which results from a superposition of the video information from the first image and the second image.

According to a second embodiment, before addition of the first and second video signals, the first video signal is weighted by a first weighting factor and the second video signal is weighted by a second weighting factor. The extreme case in which one of the weighting factors is one and the other weighting factor is zero corresponds to the case in which the video information for the pixels of the overlap region are obtained only from one video signal, that is, the video signal weighted by the weighting factor one. This situation corresponds to displaying the image for which the video signal is weighted by the weighting factor one in the foreground.

The weighting factors may under go a temporal variation, and/or they may undergo a spatial variation, that is, a variation dependent on the position of the display pixel within the overlap region. A temporal or spatial variation of the weighting factor enables a temporal or spatial cross-fading of the display from the first image to the second image in the overlap region.

During temporal variation, the weighting factor of the one video signal is initially one and then changes over time to zero, while the weighting factor of the other video signal changes from zero to one. The time period in which the transition occurs is selected so that it is greater than the time period within which the video information for a display image or half-image is transmitted, the time period preferably amounting to at least a few seconds such that a slow continuous transition for the human eye occurs in the overlap region from the display of the video information of the one video signal to the display of the video information of the other video signal.

According to one embodiment of the invention, the overlap region is subdivided into a grid such as a checkerboard pattern, and the video information from the first and the second video signals is alternately displayed in the individual fields of this grid. This action is achieved by weighting factors which assume the value one or zero in the overlap region depending on the position of the display pixel. The weighting factors may additionally undergo a temporal variation which allows for cross-fading from the display of an image in the overlap region via the display of the "checkerboard pattern" to the display of the video information of the other image in the overlap region.

Any other temporal variations or variations dependent on the position of the pixels are conceivable to produce the display of the video information in the overlap region. It should be pointed out that a position-dependent variation of the weighting factors also represents a temporal variation since the video information for the individual pixels is present in the video signals in a temporally sequential form. These variations occur, however, within a temporally defined frame. "Position-dependent variation of the weighting factors" below always signifies a temporal variation within a time frame permanently defined by the image structure, while "temporal variation of the weighting factors" signifies a variation over multiple individual images of the image sequence to be displayed.

In addition, the object of the invention is a device for providing an output signal which is used to display at least a first image from a first video signal and a second image from a second video signal within one combined picture, where the two images overlap at least partially. The device has a first input for feeding a first video signal to display the first image within a first active region of the combined picture, and a second input for feeding a second video signal to display a second image within a second active region of the combined picture.

The device has a logic circuit with at least one adder to add the first and second video signals in order to form a third video signal, and a multiplexing device to which the first, second, and third video signals are fed, and which multiplexing device provides an output signal for the combined picture.

In addition, a first control signal containing information on the position and the dimensions of the first active region, and a second control signal containing information on the position and dimensions of the second active region may be fed to the device. These control signals are capable of being fed either to separate control inputs of the device or together with the video signals containing the video information. The assignment of the first, second, and third video signals to the output signal in the multiplexing device is effected as a function of the control signals, the third video signal generated from the first and second video signals being employed to display the pixels of the overlap region.

According to one embodiment of the invention, a first multiplier for multiplying the first video signal by a first weighting factor, and a second multiplier for multiplying a second video signal by a second weighting factor are connected in series ahead of the adder.

These and other objects, features and advantages of the present invention will become more apparent in light of the following detailed description of preferred embodiments thereof, as illustrated in the accompanying drawings.

DETAILED DESCRIPTION OF THE INVENTION

Unless otherwise indicated, the same reference symbols in the figures designate components of the same significance.

Figure 1:
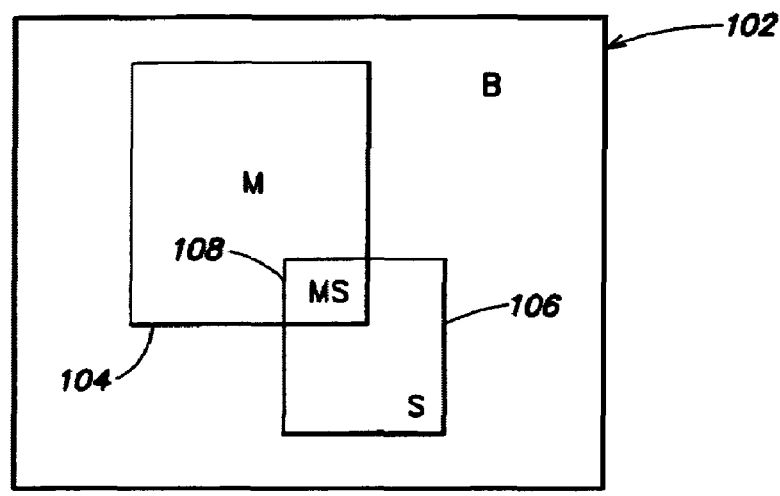
FIG. 1 is a pictorial illustration of a combined picture which contains a first image in a first active region and a second image in a second active region, wherein the images partially overlap.

FIG. 1 is a pictorial illustration of a combined picture which has, within a displayable screen region 102, a first image M in a first active region 104 and a second image S in a second active region 106, the first and second active regions 104, 106 having an overlap region 108 in which the first and second images M, S overlap. A background image B is displayed in the area outside the first and second active regions 104, 106.

Figure 2:
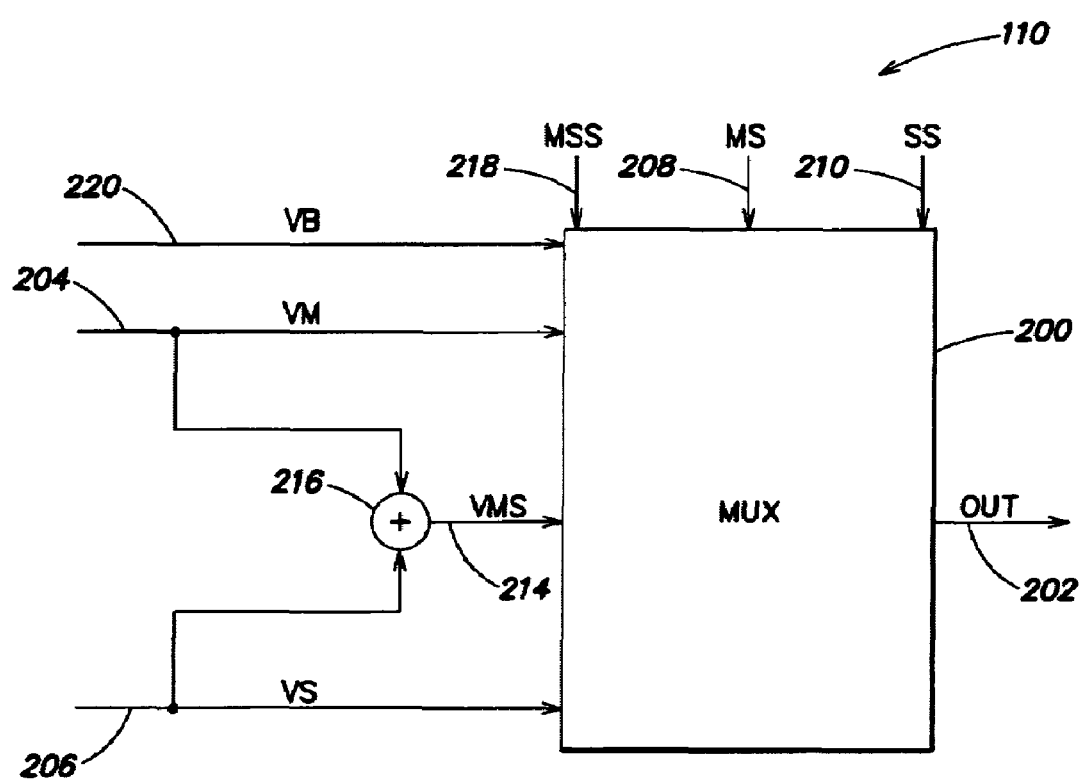
FIG. 2 illustrates a first embodiment of a device according to the invention for providing an output signal suitable for displaying the combined picture.

FIG. 2 is a schematic view of a first embodiment of a device 110 according to the invention for generating an image signal OUT on a line 202 which contains the video information of a combined picture of the type shown in FIG. 1 with at least two superimposed combined pictures M, S, and which may be employed in a conventional video display device to display the combined picture. A first video signal VM containing the video information of the first image M displayed in the first active region 104 is input on a line 204 to device 200, while a second video signal VS containing the video information of the second image S displayed in the second active region 106 is input on a line 206 to the device.

The image displayed from the output signal OUT on the line 202 is built up line-by-line, that is, the video information for adjacent pixels present in one line, and the video information for the pixels in lines lying below each other are contained in temporally sequential form in the output signal OUT. Similarly, the first video signal VM on the line 204 and the second video signal VS on the line 206 contain the video information in line-by-line temporally sequential form to display the first image M in the first active region 104 (FIG. 1), or to display the second image S in the second active region 106 (FIG. 1).

Figure 3A:
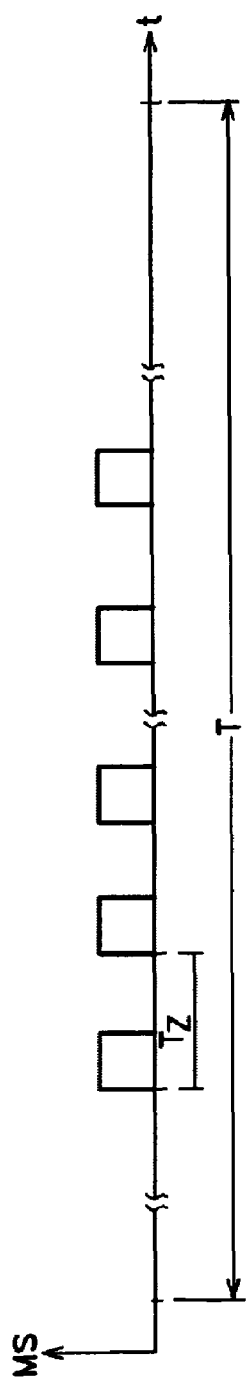
FIGS. 3A–3C are plots as a function of time of the control signals containing information on the position and the dimensions of the active regions.
Figure 3B:
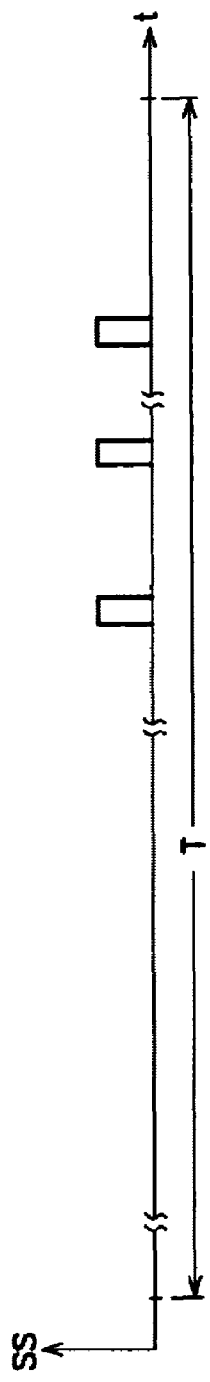

A first control signal MS on a line 208 is assigned to the first video signal VM, and a second control signal SS on a line 210 is assigned to the second video signal VS, the control signals determining the position and dimensions of the active regions 104, 106 within the combined picture. FIGS. 3A–3B are plots as a function of time of the control signals MS, SS which are periodic at the frequency of the displayed combined picture, usually 50 Hz.

Figure 3C:
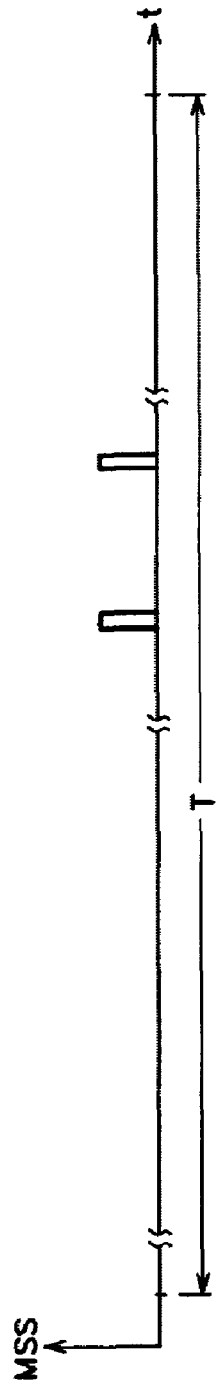

Time period T in FIGS. 3A–3C designates the time period within which the video information for the line-by-line build-up of the combined picture is transmitted. Tz designates the time period within which the video information of one line is transmitted. Active regions 104, 106 (FIG. 1) in which the video information from the first or second video signals VM, VS are displayed each represent only a segment of the displayable image region 102 (FIG. 1). The time periods at which the control signals MS, SS in FIGS. 3A, 3B, respectively, assume an upper signal level are the time periods at which the video information for the pixels of the active regions 104, 106 are transmitted within total time T. The temporal portion of the segments which assume an upper signal level at time period Tz corresponds to the ratio of the width of combined picture 102 to the width of the respective active regions 104 or 106. The number of segments MS, VS for which the control signals assume an upper signal level corresponds per period to the number of lines from which the respective active region is built up.

The first and second video signals VM, VS and their associated control signals are fed to the multiplexing device MUX 200 which combines the first and second video signals VM, VS to form the output signal OUT on the line 202. The control signals MS, SS, MSS may be fed to the multiplexing device MUX 200 separately from the video signals VM, VS containing the video information, or the control signals MS, SS may be fed to the multiplexing device MUX together with the video signals VM, VS, that is, the control signals MS, SS may be modulated upon the video signals VM,VS, a separation into the video signals VM, VS and the control signals MS, SS then being effected in the multiplexing device MUX. In the embodiment of FIG. 2, the video signals VM, VS and their associated control signals MS, SS are fed to the multiplexing device MUX separately.

According to the invention, a third video signal VMS on a line 214 is generated from the first video signal VM and the second video signal VS. In the embodiment of FIG. 2, an adder 216 adds the first and second video signals VM, VS to provide the third video signal on the line 214. This third video signal VMS contains the video information of image MS in the overlap region 108. A third control signal MSS on a line 218 is assigned to the third video signal VMS; an example of this control signal is shown in FIG. 3C which is produced by an AND relation of the first and second controls signals MS, SS. The third video signal VMS on the line 214 and its associated control signal MSS are also fed to the multiplexing device MUX.

A fourth video signal VB on the line 220 to display the background image B is fed to the device 110 and the multiplexing device MUX of FIG. 2.

The output signal OUT on the line 202 contains the video information in temporally sequential form for the adjacent pixels in the line-by-line-generated combined picture. Based on the control signals MS, SS, MSS, the multiplexing device MUX decides for each pixel of the combined picture generated from the output signal OUT whether the pixel lies within the first active region 104, within the second active region 106, within overlap region 108 of the first and second active regions 104, 106, or outside of these regions. If the display pixel lies within the first active region 104 but not in the overlap region 108, the associated video information from the first video signal VM is accepted for the output signal OUT; if the display pixel lies within the second active region 106 but not within the overlap region 108, the associated video information from the second video signal VS is accepted for the output signal OUT on the line 202; and if the display pixel lies within the overlap region 108, the associated video information from the third video signal VMS is accepted for the output signal OUT. For pixels outside the first and second active regions 104, 106, the video information from the fourth video signal VB is accepted for the output signal OUT. In contrast to known methods, a separate video signal VMS containing the video information for display in the overlap region 108 is assigned to the overlap region in the method according to the invention. In the device used in FIG. 2, the video information for the pixels of the overlap region 108 is produced from a superposition of the video information from the first video signal VM and the second video signal VS. The third video signal has the highest priority here, that is, it is always the video information from the third video signal VMS that is used to display the pixels in the overlap region 108.

Figure 4:
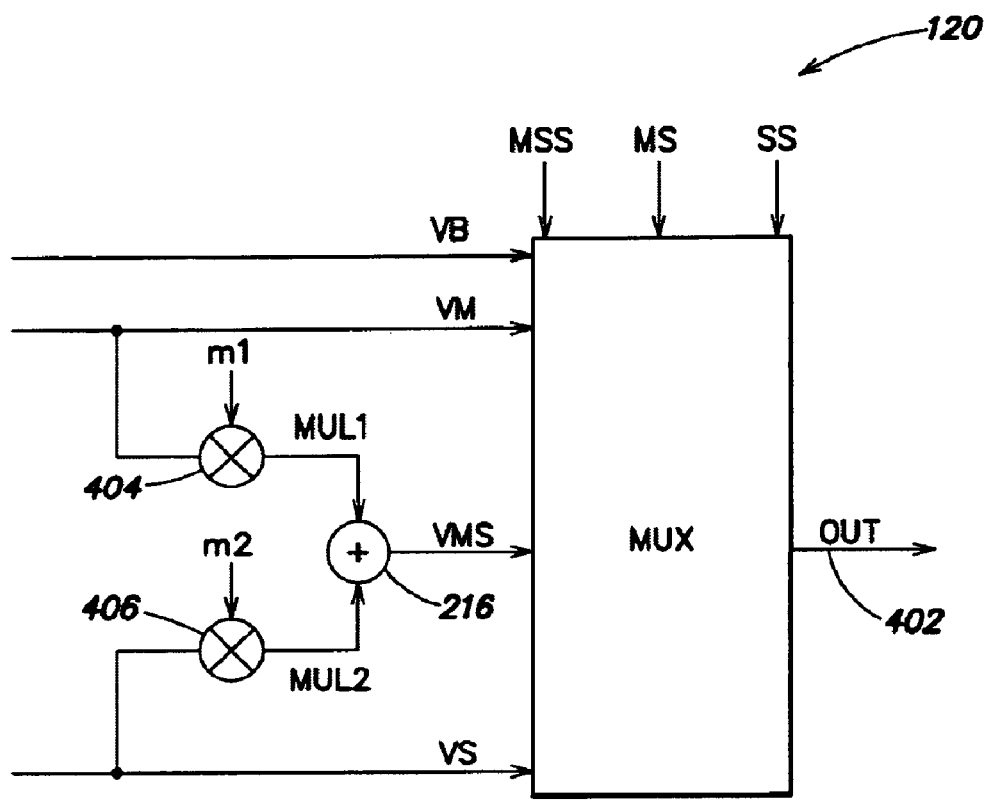
FIG. 4 illustrates a device according to the invention based on another embodiment in which the first and second video signals are weighted before generation of the third video signal.

FIG. 4 shows another embodiment of a device 120 according to the invention employed to generate an output signal OUT on a line 402 from the first and second video signals VM, VS. In this embodiment, the following are connected in series before the adder ADD 216: a first multiplexer MUL1 404 which multiplies the first video signal VM by a first weighting factor m1, and a second multiplexer MUL2 406 which multiplies the second video signal VS by a second weighting factor m2. The weighting factors m1, m2 may be fixed values or may vary temporally and/or spatially as explained below.

Figure 5:
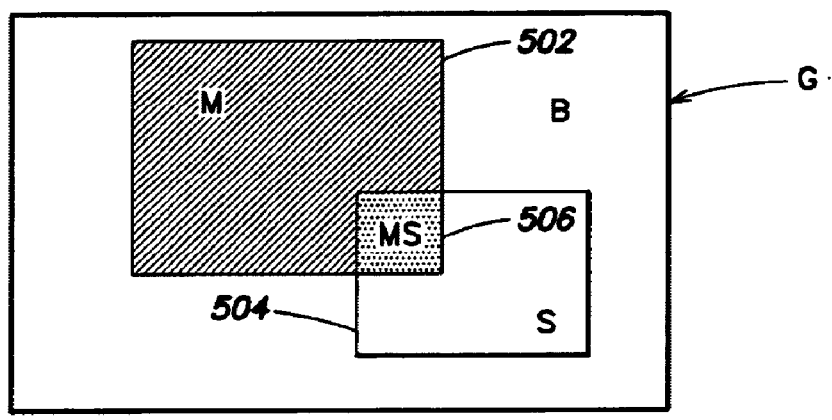
FIG. 5 is a pictorial illustration of a combined picture in which the first and second video signals during generation of the third video signal are uniformly weighted.

FIG. 5 shows a combined picture generated by a system in FIG. 4 which for purposes of illustration has a black first image M in first active region 502, and a second white image S in second active region 504. The weighting factors m1, m2 for displaying the image in FIG. 5 are 0.5 respectively—with the result that the video information for the first image M and the second image S are superposed in the overlap region 506 to form a gray image MS.

Figure 6A:
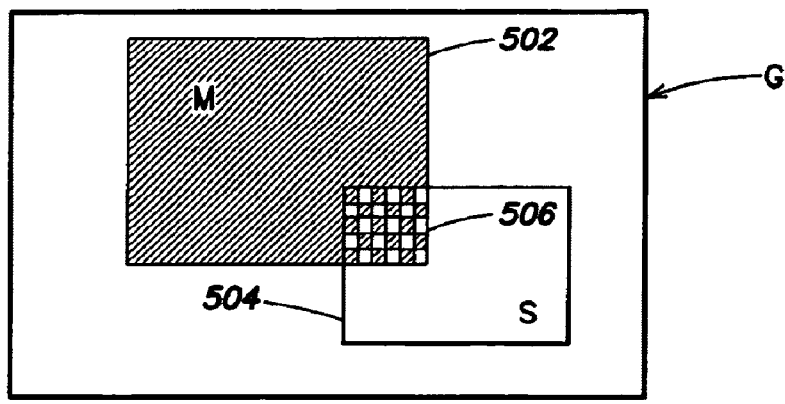
FIGS. 6–8 are schematic views of various combined pictures after weighting of the first and second video signals as a function of the position of the given pixel in the overlap region.

FIG. 6A illustrates another combined picture in which the weighting factors m1, m2 undergo a spatial variation, that is, they are dependent on the position of the display pixel within the overlap region 506. The weighting factors m1, m2 have been selected here so that they alternately assume the value one or zero for successive pixels, or a number of successive pixels, from the overlap region 506, thereby creating a checkerboard pattern within the overlap region 506, the video information from the first video signal VM being displayed in those fields in which the first weighting factor m1 is one, and the video information from the second video signal VS being displayed in those fields in which the second weighting factor m2 is one.

Figure 6B:
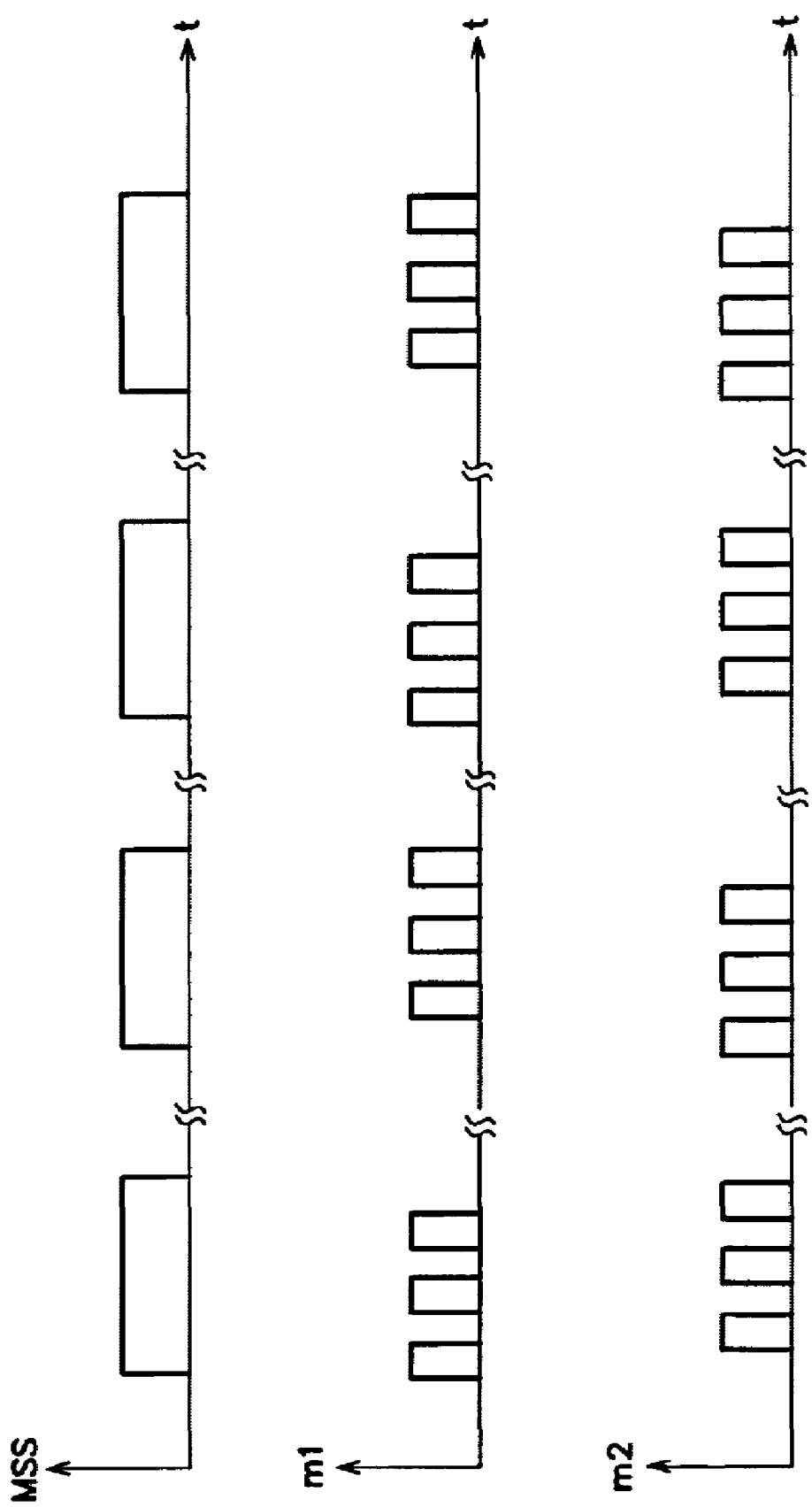

FIG. 6B is the characteristic over time for the first and second weighting factors m1, m2 for the image displayed in FIG. 6A. Signal MSS designates the control signal for the third video signal, where the temporal ranges in which the control signal MSS assumes an upper level mark those temporal ranges in which the video information of each line of the overlap region is transmitted. As the characteristics over time for the weighting factors m1, m2 indicate, the temporal segments in which the first and second weighting factors m1, m2 each assume the value one or zero, alternate.

Figure 7:
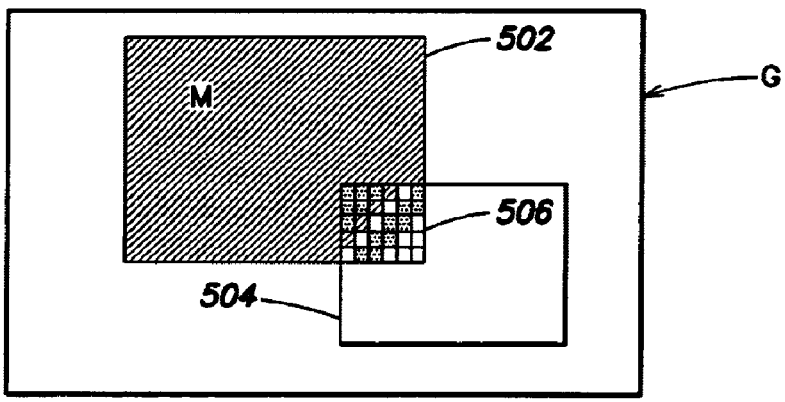

FIG. 7 shows another combined picture in which the first and second video signals VM, VS are added to generate the third video signal VMS, and are weighted before this addition. In this embodiment, the value for the weighting factors m1, m2 is similarly dependent on the position of the display pixel in the overlap region 506. The relationship applicable here is the following: the first weighting factor m1 increases relative to the second weighting factor m2 the further the pixel lies within the upper left corner of the overlap region 506, while the second weighting factor m2 increases relative to the first weighting factor m1 the further the display pixel lies within the lower right corner of the overlap region A12.

Figure 8:
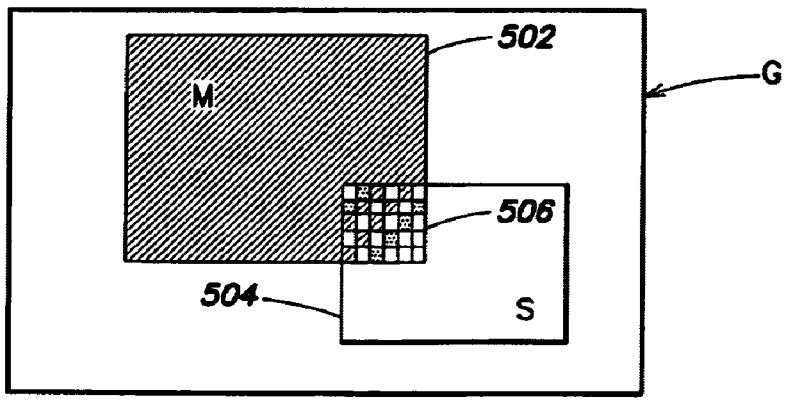

FIG. 8 shows another embodiment in which the overlap region 506 is subdivided, as in the embodiment of FIG. 6A, into a grid where the weighting factors m1, m2 vary as a function of the position of the grid regions within the overlap region 506.

Figure 9:
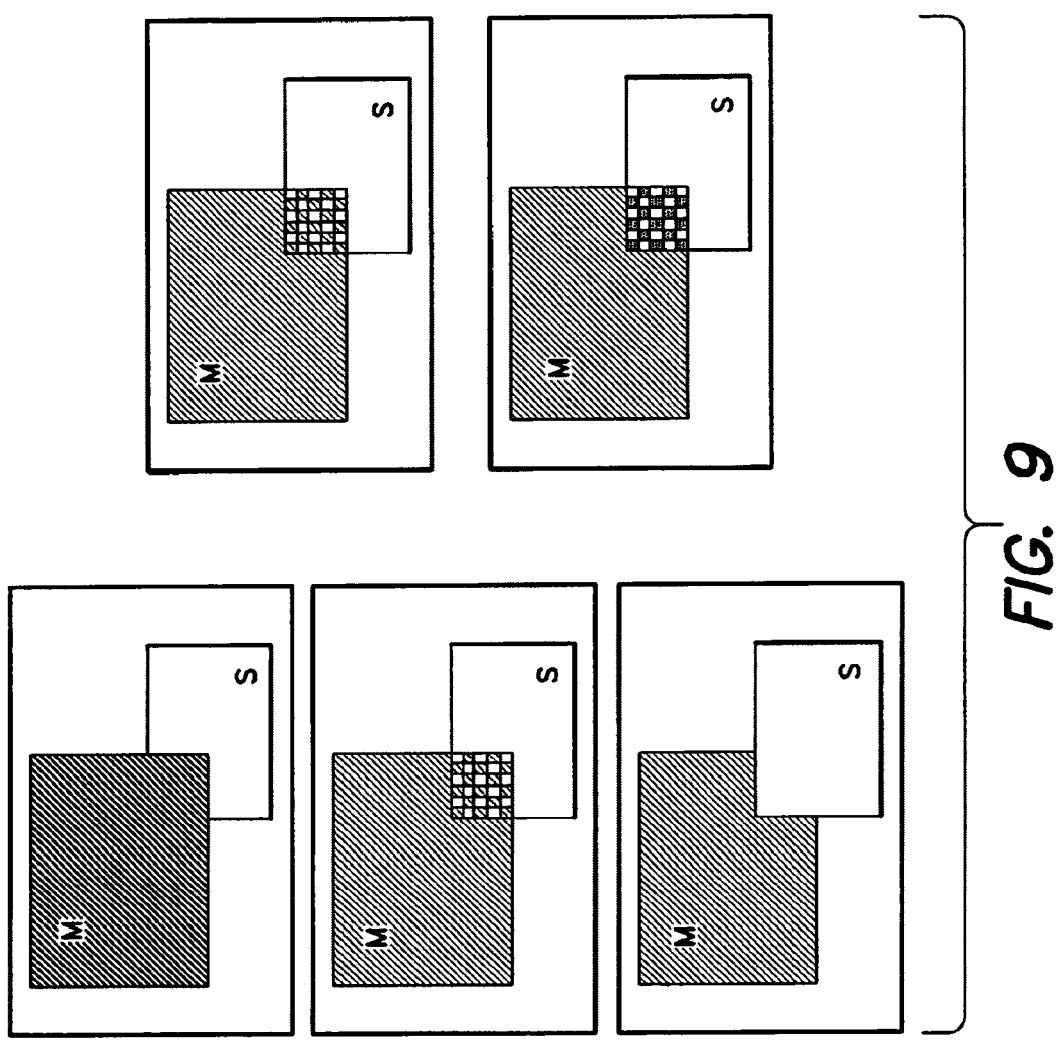
FIG. 9 is a pictorial illustration of a sequence of images illustrating weighting factors varying over time to achieve a temporal cross-fading effect.

In another embodiment, there is an additional feature beyond varying the weighting factors as a function of the position of the display pixel in the overlap region 506: here the weighting factors vary over time—specifically over a time period extending over the display of multiple successive individual images, as is illustrated by the image sequence in FIG. 9. Initially, the first weighting factor m1 is one, causing the video information of the first image M to be displayed in the overlap region 506, while first image M is in the foreground. Starting from the first image M in the foreground for the combined picture shown at the top, a cross-fading takes place to the second image S located in the foreground as indicated in the last combined picture shown at the bottom. In the example, the cross-fading occurs in a grid pattern in which initially the second weighting factor m2 increases in every other field of the grid, while the first weighting factor m1 decreases until the video information for the second image S is reproduced in these fields. Subsequently, the first weighting factor m1 is reduced in the remaining fields, while the second weighting factor m2 is increased until the video information from the video signal VS, or the second image, is also reproduced in these fields.

The fundamental aspect of the method according to the invention is that a third video signal VMS is generated from the first and second video signals VM containing the video information of the first image M displayed in first active regions A1, A2, and from the second video signal VS containing the video information of the second image S displayed in the second active region—this third video signal being treated as a third video channel when generating the output signal OUT. The video information from the third video signal VMS here always remains in the foreground.

Figure 10:
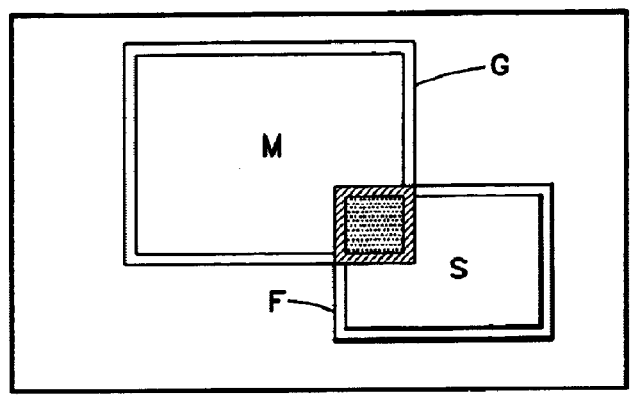
FIG. 10 is a pictorial illustration of another combined picture in which the images in the active regions are each surrounded by a frame.

FIG. 10 shows another combined picture in which a first frame G is displayed around the first image M, and a second frame F is displayed around the second image S, where the images M, S and the frames G, F surrounding the images partially overlap.

Figure 11:
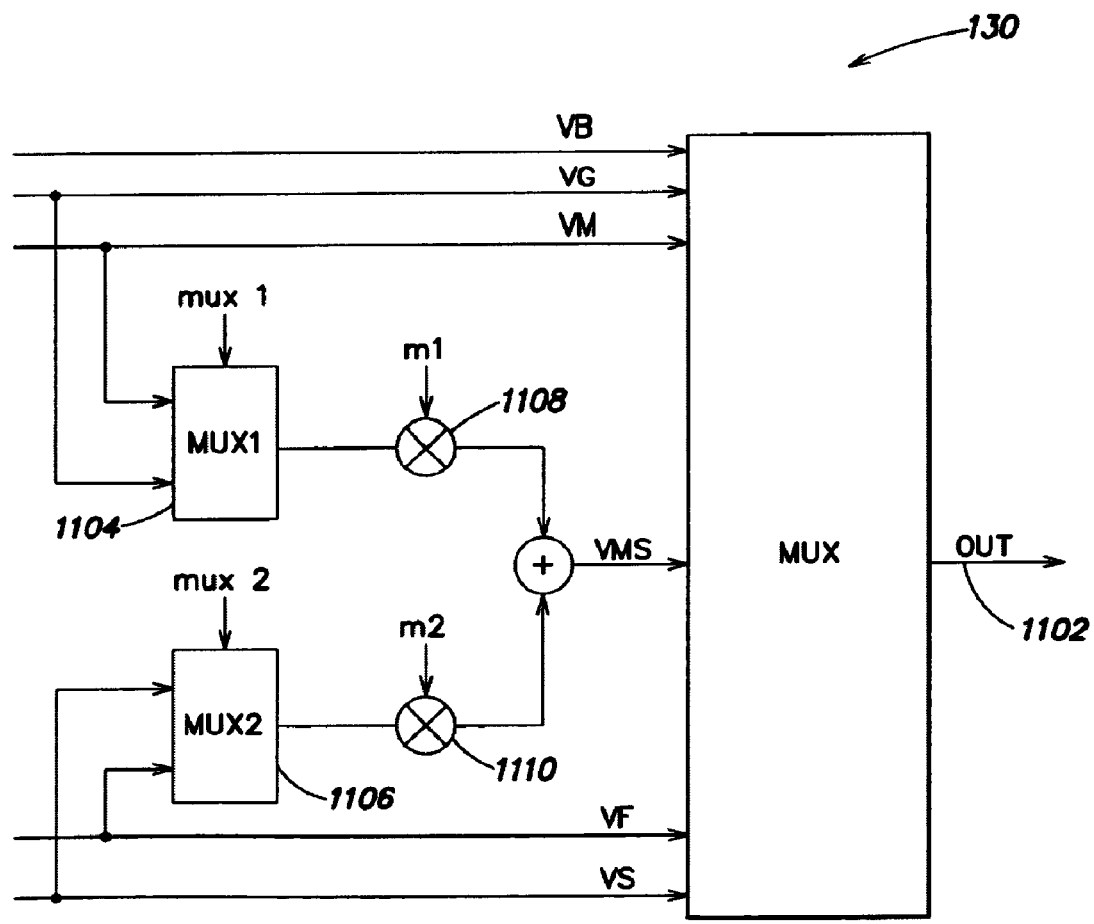
FIG. 11 illustrates a device according to the invention based on another embodiment for generating a combined picture in FIG. 10.

FIG. 11 shows an embodiment of a device 130 according to the invention for generating an output signal OUT on a line 1102 to display the combined picture.

In addition to the first and second video signals VM, VS, and the video signal VS for the background image B, a video signal VG for first frame G and a second video signal VF for the second frame F are fed to the device 130. The first video signal VM and the video signal for the first frame VG are fed to a first multiplexer MUX1 1104 to generate third video signal VMS, the first multiplier MUL1 1108 being connected in series after the output of the multiplexer MUX1 1104. In addition, the second video signal VS and the video signal VF for the second frame F are fed to a second multiplexer MUX2 1106, the second multiplexer MUL2 1 110 being connected in series after the output of the multiplexer MUX2 1106. The first multiplexer MUX1 1104 transmits the video information from the first video signal VM, or from the video signal VG for the first frame G, to its output as a function of a control signal mux1, control signal mux1 containing the information as to whether the display pixel belongs to the first active region A1 or to the region of the first frame G. Similarly, the second multiplexer MUX2 1106 transmits the video information from the second video signal VS, or from video signal VF for the first frame F, to its output as a function of a control signal mux2, the control signal mux2 containing the information as to whether the display pixel belongs to the second active region A2 or to the region of second frame F.

Although the present invention has been shown and described with respect to several preferred embodiments thereof, various changes, omissions and additions to the form and detail thereof, may be made therein, without departing from the spirit and scope of the invention.

What is claimed is:

1. A method for displaying a first image and a second image which at least partially overlap within one combined picture, said method comprising:

receiving a first video signal to display the first image within a first active region of the combined picture, the first video signal containing the video information for adjacent pixels of the first image in temporally sequential form;

receiving a second video signal to display the second image within a second active area of the combined picture, the second video signal containing the video information for adjacent pixels of the first image in temporally sequential form;

generating a third video signal from the first and second video signals to display a third image in an overlap region of the first and second active regions; and for each pixel location within the combined picture, generating an output signal by assigning video information associated with the pixel location from the first video signal to the output signal whenever the pixel location within the combined picture lies within the first active region, and assigning video information from the second video signal to the output signal whenever the pixel location within the combined picture lies within the second active region, and wherein the video information from the third video signal is assigned to the output signal whenever the pixel location of the combined picture lies within the overlap region.

2. The method of claim 1, wherein the step of generating the third video signal comprises summing the first video signal and the second video signal to generate the third video signal.

3. The method of claim 1, wherein the step of generating the third video signal comprises:

multiplying the first video signal by a first weighting factor to generate a first weighted video signal and multiplying the second video signal by a second weighting factor to generate a second weighted video signal; and summing the first and second weighted video signals to generate the third video signal.

4. The method of claim 3, wherein the first and second weighting factors are a function of the position of the associated pixel within the overlap region.

5. The method of claim 4, wherein the first and second weighting factors vary over a time period which is greater than the time period within which the video information for the combined picture is transmitted.

6. The method of claim 5, wherein the first and second weighting factors may each include a value between zero and one, and the sum of the first and second weighting factors is equal to one.

7. The method of claim 3, wherein the first and second weighting factors are equal.

8. Device for displaying a first image and a second image which at least partially overlap within a combined picture said device comprising:

a first input to feed a first video signal to display the first image within a first active region of the combined picture, wherein the first video signal contains video information for adjacent pixels of the first image in temporally sequential form;

a second input to feed a second video signal to display the second image within a second active region of the combined picture, wherein the second video signal contains video information for adjacent pixels of the second image in temporally sequential form;

a logic circuit that is responsive to the first and second video signals to generate a third video signal from the first and second video signals to display a third image within an overlap region of the first and second active regions;

a multiplexing device that receives the first, second, and third video signals and generates an output signal to display the combined picture, wherein the multiplexing device assigns the video information from the first video signal to the output signal whenever the associated pixel of the combined picture lies within the first active region, wherein the multiplexing device assigns the video information from the second video signal to the output signal whenever the associated pixel of the combined picture lies within the second active region, and wherein the multiplexing device assigns the video information from the third video signal to the output signal whenever the associated pixel of the combined picture lies within an overlap region of the first and second active regions.

9. The device of claim 8, wherein a plurality of control signals are input to the multiplexing device, the plurality of control signals contain information on the position of the first and second active regions and of the overlap region, and are employed in the multiplexing device to assign the video information from the first, second, and third video signals to the output signal.

10. The device of claim 9, wherein the logic circuit comprises an adder which adds the first and second video signals to generate the third video signal.

11. The device of claim 10, wherein the logic circuit comprises a first multiplier which is connected in series before the adder and which multiplies the first video signal by a first weighting factor, and a second multiplier which is connected in series before the adder and which multiplies the second video signal by a second weighting factor.

12. A device for processing a first video signal and a second video signal that contain image data which overlap within a combined picture, said device comprising:

a processing element that receives the first video signal containing first image pixel data and receives the second video signal containing second image pixel data, and processes the first video signal and the second video signal to generate a third video signal indicative of an overlap region of images formed by the first and second video signals;

a controller that receives the first video signal, the second video signal, and the third video signal, and in response to a plurality of control signals selectively outputs one of the first, second and third video signals, wherein the third video signal is a weighted sum of the first and second video signals, wherein the control signals comprise a first control signal indicative of the location and size of a first image associated with the first video signal within a picture and a second control signal indicative of the location and size of a second image associated with the second video signal within the picture;

a first multiplier that multiplies the first video signal by a first scaling factor to provide a first weighted video signal;

a second multiplier that multiplies the second video signal by a second scaling factor to provide a second weighted video signal; and a summer that sums the first and second weighted video signal to provide the third video signal.

13. The device of claim 12, wherein the sum of the first and second scaling factors is equal to one, and the values of the first and second scaling factors are between zero and one.

14. The device of claim 12, wherein the control signals comprise periodic control signals.

* * * * *

UNITED STATES PATENT AND TRADEMARK OFFICE
CERTIFICATE OF CORRECTION

PATENT NO. : 7,050,112 B2  Page 1 of 1
APPLICATION NO. : 10/161212
DATED : May 23, 2006
INVENTOR(S) : Rieder et al.

It is certified that error appears in the above-identified patent and that said Letters Patent is hereby corrected as shown below:

<u>Column 8</u> line 5, after "MUL2" delete "1"
line 6, delete "110" and insert --1110--

Signed and Sealed this

Twenty-second Day of August, 2006

JON W. DUDAS
*Director of the United States Patent and Trademark Office*